(12) United States Patent
Beskrovny et al.

(10) Patent No.: US 9,177,155 B2
(45) Date of Patent: *Nov. 3, 2015

(54) HYBRID ANALYSIS OF VULNERABLE INFORMATION FLOWS

(71) Applicant: International Business Machines Corporation, Armonk, NY (US)

(72) Inventors: Evgeny Beskrovny, Ramat Gan (IL); Adi Sharabani, Ramat Gan (IL); Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/025,874

(22) Filed: Sep. 13, 2013

(65) Prior Publication Data

US 2014/0189875 A1 Jul. 3, 2014

Related U.S. Application Data

(63) Continuation of application No. 13/731,170, filed on Dec. 31, 2012, now Pat. No. 8,869,287.

(51) Int. Cl.
*G06F 21/57* (2013.01)
*H04L 29/06* (2006.01)

(52) U.S. Cl.
CPC .......... *G06F 21/577* (2013.01); *H04L 63/1433* (2013.01)

(58) Field of Classification Search
None
See application file for complete search history.

(56) References Cited

U.S. PATENT DOCUMENTS

| 7,284,274 | B1 | 10/2007 | Walls et al. | |
|---|---|---|---|---|
| 7,392,545 | B1 * | 6/2008 | Weber et al. | 726/25 |
| 7,849,509 | B2 * | 12/2010 | Venkatapathy et al. | 726/25 |
| 2005/0015752 | A1 * | 1/2005 | Alpern et al. | 717/131 |
| 2007/0074169 | A1 * | 3/2007 | Chess et al. | 717/126 |

(Continued)

FOREIGN PATENT DOCUMENTS

| CN | 101853200 A | 6/2010 |
|---|---|---|
| CN | 102521117 A | 6/2012 |

OTHER PUBLICATIONS

U.S. Appl. No. 13/731,170, Non-Final Office Action, Feb. 28, 2014, 20 pg.

(Continued)

*Primary Examiner* — Jeffrey Pwu
*Assistant Examiner* — Wasika Nipa
(74) *Attorney, Agent, or Firm* — Cuenot, Forsythe & Kim, LLC

(57) ABSTRACT

Arrangements described herein relate to analyzing vulnerable information flows in an application. A black-box scan of the application can be performed to record a call-tree representation of call stacks arising in the application due to test inputs provided during the black-box scan. For each path in the call-tree representation that does not constitute a vulnerable information flow during the black-box scan, a static analysis can be performed to determine at least one parameter value that, when abstracted, drives execution of the application, via the path, to flow to the at least one security sink. A security report can be generated identifying at least one of the paths in the call-tree representation that does not constitute the vulnerable information flow during the black-box scan, but flows to the at least one security sink when the at least one parameter value is abstracted.

9 Claims, 4 Drawing Sheets

(56) References Cited

U.S. PATENT DOCUMENTS

| | | | |
|---|---|---|---|
| 2009/0282480 A1* | 11/2009 | Lee et al. | 726/22 |
| 2011/0055813 A1* | 3/2011 | Calendino et al. | 717/124 |
| 2011/0107307 A1 | 5/2011 | Liu et al. | |
| 2011/0126288 A1* | 5/2011 | Schloegel et al. | 726/25 |
| 2011/0173693 A1 | 7/2011 | Wysopal et al. | |
| 2011/0231936 A1 | 9/2011 | Williams et al. | |
| 2011/0271253 A1* | 11/2011 | Bnayahu et al. | 717/123 |
| 2012/0185943 A1 | 7/2012 | Tripp | |
| 2013/0239219 A1* | 9/2013 | Siman | 726/25 |
| 2014/0189874 A1 | 7/2014 | Beskrovny et al. | |

OTHER PUBLICATIONS

WIPO Appln. No. PCT/IB2013/060235, International Search Report and Written Opinion, Mar. 20, 2014, 10 pg.

U.S. Appl. No. 13/731,170, Notice of Allowance, Jun. 18, 2014, 8 pg.

Tripp, O. et al., "Hybrid Analysis for JavaScript Security Assessment," In 8th Joint Meeting of European Software Engineering Conf. and ACM SIGSOFT Sym. on the Foundations of Software Engineering, ESEC / FSE 2011, Industrial Track , Sep. 5-9, 2011,retrieved from the Internet: <http://www.cs.tau.ac.il/~omertrip/fse11/paper.pdf>, 4 pgs.

Halfond, W.G.J. et al., "Improving penetration testing through static and dynamic analysis," Journal of Software Testing, Verification & Reliability, vol. 21, No. 3, Sep. 2011, pp. 195-214.

Junior, M.A.B. et al., "Improving black box testing by using neuro-fuzzy classifiers and multi-agent systems," 2010 10th Int'l. Conf. on Hybrid Intelligent Systems (HIS), Aug. 23-25, 2010, pp. 25-30.

"Fortify Software Debuts Next-Gen Web App Hybrid 2.0 Security Analysis with HP," [online] HP Fortify, Feb. 22, 2011 [retrieved Aug. 2, 2012] retrieved from the Internet: <https://www.fortify.com/news-and-events/press-releases/2010/2010-02-22.html>, 2 pgs.

Eng, C., "A Dose of Reality on Automated Static-Dynamic Hybrid Analysis," Veracode, Inc. © 2010, 8 pgs.

Sen, K. "Concolic Testing of Multithreaded Programs and its Application to Testing Security Protocols," Technical Report UIUCDCS-R-2006-2676, Univ. of Illinois at Urbana Champaign, 2006, 12 pgs.

* cited by examiner

300

```
Perform a black-box scan of the application, using a processor, to
record a call-tree representation of call stacks arising in the
application due to test inputs provided during the black-box scan
302
```

```
Perform, for each path in the call-tree representation that does not
constitute a vulnerable information flow during the black-box scan, a
static analysis to determine at least one parameter value that, when
abstracted, drives execution of the application, via the path, to flow to
the at least one security sink
304
```

```
Determine, for each path in the call-tree representation that does not
constitute a vulnerable information flow during the black-box scan, a
security confidence level of the path according to a number of
parameter values that need to be abstracted to drive execution of the
application, via the path, to flow to the at least one security sink
306
```

```
Generate a security report identifying at least one of the paths in the
call-tree representation that does not constitute a vulnerable
information flow during the black-box scan, but flows to the at least
one security sink when the at least one parameter value is abstracted
308
```

FIG. 3

HYBRID ANALYSIS OF VULNERABLE INFORMATION FLOWS

CROSS-REFERENCE TO RELATED APPLICATIONS

This application is a Continuation of U.S. application Ser. No. 13/731,170, filed on Dec. 31, 2012, the entirety of which is incorporated herein by reference.

BACKGROUND

The present arrangements relate to performing security analysis of software applications and, more particularly, to analyzing vulnerable information flows.

Security scanning of software applications has traditionally been implemented in one of two ways: black-box scanning or static program analysis. A black-box scan is a security test in which an analysis tool (i.e., a black-box scanner) tests an application for security vulnerabilities while the application executes, for instance by simulating any of a variety of known techniques intended to circumvent security measures. For example, if testing a web-based application, the analysis tool may simulate a cross-site scripting (XSS) attack or a SQL injection attack by attempting to inject malicious scripts, or payloads, into the application. When performing black-box scanning, the black-box scanner assumes no prior knowledge of the application being tested.

A static program analysis is an analysis of a static representation of an application. In most cases, the analysis is performed on some version of the application's source code and in other cases some form object code. A static program analysis, for example, may analyze a control flow graph generated for the application to identify security vulnerabilities that may be present in the application.

BRIEF SUMMARY

One or more embodiments disclosed within this specification relate to analyzing vulnerable information flows in an application.

A method of analyzing vulnerable information flows in an application can include performing a black-box scan of the application, using a processor, to record a call-tree representation of call stacks arising in the application due to test inputs provided during the black-box scan. The method also can include performing, for each path in the call-tree representation that does not constitute a vulnerable information flow during the black-box scan, a static analysis to determine at least one parameter value that, when abstracted, drives execution of the application, via the path, to flow to the at least one security sink. The method further can include generating a security report identifying at least one of the paths in the call-tree representation that does not constitute the vulnerable information flow during the black-box scan, but flows to the at least one security sink when the at least one parameter value is abstracted.

Another method of analyzing vulnerable information flows in an application can include performing a black-box scan, using a processor, of the application to record a call-tree representation of call stacks arising in the application due to test inputs provided during the black-box scan. The method also can include performing for each path in the call-tree representation that does not constitute a vulnerable information flow during the black-box scan, a static analysis to determine at least one parameter value that, when abstracted, drives execution of the application, via the path, to flow to the at least one security sink. The method further can include responsive to determining that abstracting the first parameter value does not drive execution of the application, via the path, to flow to the at least one security sink, abstracting at least a second parameter value, and determining whether abstracting both the first and second parameter values drives execution of the application, via the path, to flow to the at least one security sink. The method also can include generating a security report that identifies at least one of the paths in the call-tree representation that does not constitute the vulnerable information flow during the black-box scan, but flows to the at least one security sink when both the first and second parameter values are abstracted.

BRIEF DESCRIPTION OF THE SEVERAL VIEWS OF THE DRAWINGS

FIG. 3 is a flow chart illustrating a method of for analyzing vulnerable information flows in an application in accordance with another embodiment disclosed within this specification.

DETAILED DESCRIPTION

Figure 1:
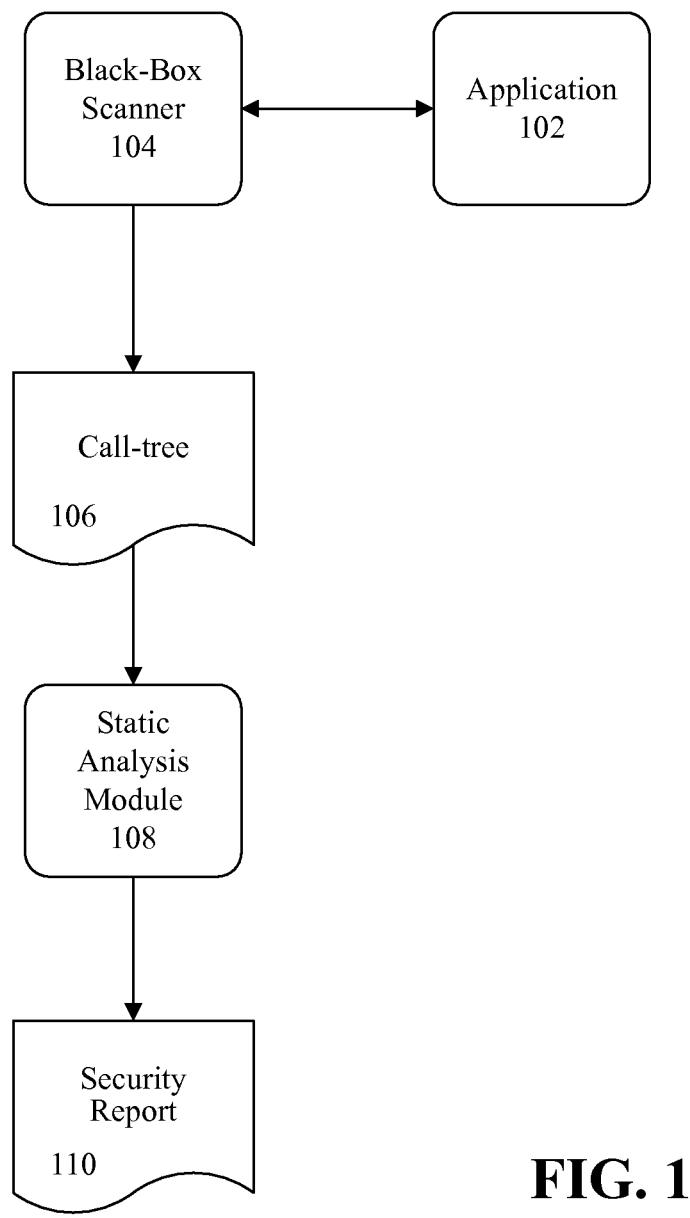
FIG. 1 is a block diagram illustrating a system for analyzing vulnerable information flows in an application in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to performing security analysis of software applications (hereinafter "applications") and, more particularly, to analyzing vulnerable information flows using a hybrid approach utilizing both black-box scanning and static analysis. In illustration, a black-box scan can be performed on the application to record a call-tree representation of call stacks arising in the application due to test inputs provided during the black-box scan. For each path in the call-tree representation that does not constitute a vulnerable information flow during the black-box scan, a static analysis can be performed to determine at least one parameter value that, when abstracted, drives execution of the application, via the path, to flow to the security sink. A corresponding report can be generated.

Several definitions that apply throughout this document will now be presented.

As used herein, the term "call stack" means a stack data structure that stores information about the active subroutines of a computer program, such as an application.

As used herein, the term "abstract" means to disassociate from a specific instance. For example, when a parameter value is abstracted, a value assigned to the particular parameter can be unspecified. Session attributes, cookie values, and the like also can be abstracted.

As used herein, the term "security sink" means a module, function or procedure that consumes in input value and performs an operation on the input value that is security sensitive.

As used herein, the term "black-box scan" means a security test in which an analysis tool (e.g., a black-box scanner) tests an application for security vulnerabilities while the application executes. By way of example, a black-box scanner can provide to the application various test payloads simulating any of a variety of known techniques for exploiting security vulnerabilities, and so on.

As used herein, the term "static program analysis" means an analysis of a static representation of an application. In other words, the application need not be executing while the static analysis is performed. For example, a static program analysis may analyze a call-tree representing previously recorded call stacks of the application to identify security vulnerabilities that may be present in the application.

As used herein, the term "downgrader" means a module, routing or function that endorses, sanitizes and/or validates input data.

FIG. 1 is a block diagram illustrating a system 100 for analyzing vulnerable information flows in an application 102 in accordance with one embodiment disclosed within this specification. While the application 102 executes, a black-box scanner 104 can perform a black-box scan of the application and, based on the black-box scan, generate a call-tree 106 representing call stacks arising in the application during processing of test inputs provided to the application 102 by the black-box scanner 104.

When performing the black-box scan, the black-box scanner 104 can simulate a malicious attack on the application 102, for example by simulating a cross-site scripting (XSS) attack, a SQL injection attack, or any other form of malicious attack. In illustration, assume that the application 102 is a web-based application that prompts users to enter one or values (e.g., alphanumeric text, symbols, or the like) into one or more fields. The black-box scanner 104 can establish a user session with the application 102, in which case the application 102 can prompt the black-box scanner 104 to enter the value(s). In response, the black-box scanner 104 can provide one or more test inputs, for example various alphanumeric text, symbols, script, or the like. The black-box scanner can monitor the manner in which the application 102 processes these test inputs, identifying call stacks arising in the application 102 to process the test inputs. The black-box scanner 104 can repeat this process numerous times, and record in the call-tree 106 the call stacks that arise in the application 102.

Oftentimes, the ability of the black-box scanner 104 to generate test inputs that thoroughly test the security of the application 102 against all malicious inputs is rather limited. In a sense, the black-box scanner 104 uses algorithms that attempt to guess at test inputs that may reveal security vulnerabilities in the application 102. Such algorithms, however, do not always cover every possible scenario.

In accordance with the present arrangements, the system 100 further can include a static analysis module 108 that performs a static analysis of the application 102. Specifically, the static analysis module 108 can perform a static analysis of the call-tree 106 in which the call stacks identified by the black-box scanner 104 are recorded. In this regard, the static analysis module 108 can identify paths (i.e., flows) in the call-tree 106 that potentially represent security vulnerabilities in the application 102. For example, the static analysis module 108 can generate a security report 110 that indicates such paths as witnesses to security vulnerabilities. The security report 110 can be made to be available to a user in any suitable manner. For example, the security report 110 can be presented on a display, presented in a printout, stored to a file, etc. The manner in which the static analysis module 108 identifies paths that potentially represent security vulnerabilities in the application 102 will be described herein.

Figure 2:
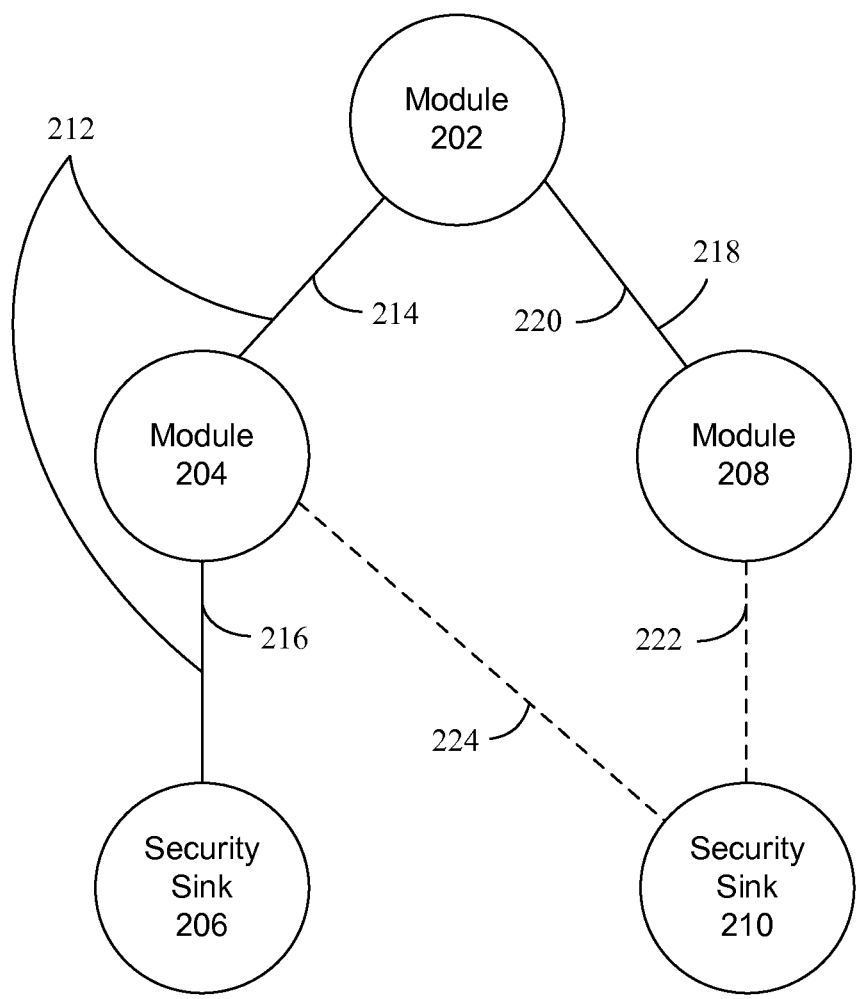
FIG. 2 is an example of a call-tree representation generated in accordance with one embodiment disclosed within this specification.

FIG. 2 is an example of a call-tree representation (hereinafter "call-tree") 200 generated in accordance with one embodiment disclosed within this specification. As noted, the call-tree 200 can include a plurality of call stacks recorded by the black-box scanner 104. The call-tree 200 can include a plurality of call stacks 202, 204, 206, 208, 210. In this example, the call stacks 202, 204, 208 can be stack data structures that store information about modules which generally process user inputs. The call stacks 206, 210 can be stack data structures that store information about security sinks, which can be modules that perform security sensitive operations on user input values. For simplicity, hereinafter, the call stacks 202, 204, 208 for the modules may be referred to as "module 202", "module 204" and "module 208", respectively. The call stacks 206, 210 for the security sinks may be referred to as "security sink 206" and "security sink 210", respectively.

In this example, the call-tree 200 indicates paths 212, 218 identified by the black-box scanner 104. The path 212 can include an edge 214 from the module 202 to the module 204, and an edge 216 from the module 204 to the security sink 206. In this regard, the black-box analysis recognized that the path 212 traverses the module 204, and arrives at the security sink 206. The path 212 can be triggered by one or more particular test inputs provided to the application 102 by the black-box scanner 104. If the module 204 is a downgrader, the path 212 may not constitute a vulnerable information flow during the black-box scan. If however, the module 204 is not a downgrader, the path may constitute a vulnerable information flow.

The path 218 can include an edge 220 from the module 202 to the module 208. In some instances, the module 208 may not be able to process the test inputs provided during the black-box scan, in which case the path 218 may only include the edge 220. In other words, the path 218 did not flow to a security sink 206, 210 during the black-box scan. Since it did not flow to a security sink 206, 210 during the black-box scan, the path 218 may not constitute a vulnerable information flow during the black-box scan.

During the static analysis, the static analysis module 108 can determine which parameter values processed by the application 102 need to be abstracted to drive execution of the application, via the path 218, to flow to one or more security sinks 206, 210. Similarly, the static analysis module 108 can determine which parameter values processed by the application 102 need to be abstracted to drive execution of the application, via the path 212, to flow to one or more security sinks 206, 210 without traversing a downgrader. For instance, the module 204 may be a downgrader, but abstracting the parameter values may force the path 212 to change and reach the security sink 206 without traversing the downgrader, or to reach the security sink 210 without traversing the downgrader.

In illustration, the static analysis module 108 can determine which parameter values processed by the application 102 need to be abstracted to drive execution of the application 102 to flow to one or more closest security sinks 206, 210. For instance, assume that the path 218 arrives at one or more modules (e.g., the module 208) that perform decisions based on user input values. The static analysis module 108 can identify one or more security sinks 206, 210 closest to such module 208 (e.g., where the least number of other modules, or no modules, are between the decision module and the security sink in a potential path). In this example, the security sink 210 may be the closest security sink to the module 208, and thus the static analysis module 108 can determine which parameter values processed by the application 102 need to be abstracted to drive execution of the application 102, via the path 218, to flow to the security sink 210, which is represented by the edge 222, or to the security sink 206. Similarly, the static analysis module 108 can determine which parameter values processed by the application 102 need to be abstracted to drive execution of the application 102 to change the path 212, to flow to the security sink 210, represented by the edge 224, or to flow to the security sink 206 without traversing a downgrader (e.g., the module 204).

The following example discusses extracting parameter values to statically analyze the path 218, but it will be appreciated that a similar analysis can be applied to analyze the path 212. The static analysis module 108 can abstract a first parameter value, and statically analyze the path 218 to determine whether, with the parameter value extracted, the path 218 will flow to the security sink 210. In other words, the static analysis module 108 can determine whether the edge 222 will be added to the path 218 when the abstracted parameter is used. If this is the case, the path 218 will flow from the module 202 to the security sink 210. Because the path 218 can be driven to the security sink 210 by abstracting the parameter, a security vulnerability can be indicated. Moreover, this security vulnerability may not have been identified during the black-box scan. Accordingly, performing a hybrid analysis that includes both a black-box scan and a static analysis can greatly decrease the number of security vulnerabilities that would otherwise remain detected if only a black-box scan were performed.

By way of example, assume during the black-box scan the black-box scanner 104 sent to the application 102 an HTTP request with the following GET parameters:

"name"=>"John Doe"

"role"=>"<script> . . . </script</>"

This test may have failed because the value of "name" doesn't contain "Admin". The static analysis module 108 can analyze this situation, and propose the following GET parameters:

"name"=>*

"role"=>"<script> . . . </script</>"

By abstracting the parameter "name" to not be limited to any particular value, this may drive the path 218 to flow to the security sink 210, which may represent a security vulnerability in the application 102, which can be provided in the security report 110.

In some instances merely abstracting one parameter value will not drive the path 218 to flow to the security sink 210. Nonetheless, a security vulnerability still may be present in the application 102. Accordingly, if the application 102 is configured to receive more than one parameter value input from a user, next, the static analysis module 108 can abstract two of the parameter values, and statically analyze the path 218 to determine whether, with two parameter values extracted, the path 218 will flow to the security sink 210. If this is the case, the path 218 can be indicated as being a security vulnerability and identified in the security report 110.

In some instances merely abstracting two parameter values will not drive the path 218 to flow to the security sink 210. Nonetheless, a security vulnerability still may be present in the application 102. Accordingly, if the application 102 is configured to receive more than two parameter values input from a user, next, the static analysis module 108 can abstract three of the parameter values, and statically analyze the path 218 to determine whether, with three parameter values extracted, the path 218 will flow to the security sink 210. If this is the case, the path 218 can be indicated as being a security vulnerability and identified in the security report 110.

This process can continue until the number of parameter values abstracted equals the number of parameter values the application 102 is configured to receive from the user. Moreover, the process can be implemented for each path that does not constitute a vulnerable information flow during the black-box scan.

Based on the static analysis described above, the static analysis module 108 can, for each path in the call-tree 200 that does not constitute a vulnerable information flow during the black-box scan, determine a security confidence level according to a number of parameter values that need to be abstracted to drive execution of the application 102 to flow (e.g., via the path 218), to the security sink (e.g., the security sink 210). For example, if only one parameter value needs to be abstracted to drive the path 218 to flow to the security sink 210, there may be a low level of confidence that the application 102 is secure. If, however, three parameter values need to be abstracted to drive the path 218 to flow to the security sink 210, there may be a relatively high level of confidence that the application 102 is secure.

In one aspect of the present arrangements, the static analysis module 108 can abstract a first parameter without abstracting other parameters (e.g., provide values for the first parameter) to determine whether the path 218 will flow to the security sink 210, then abstract a second parameter without abstracting the other parameters to determine whether the path 218 will flow to the security sink 210, then abstract a third parameter without abstracting the other parameters to determine whether the path 218 will flow to the security sink 210, and so on. Accordingly, if only abstracting certain parameters drives the path 218 to flow to the security sink 210, the static analysis module 108 identify such parameters, and indicate those parameters in the security report 110. Moreover, the static analysis module 108 also can indicate in the security report 110 parameter values, or ranges of parameter values, for parameters that drive the path 218 to flow to the security sink 210.

In another aspect of the present arrangements, rather than sequentially abstracting one parameter, then two parameters, then three parameters, etc., the static analysis module 108 can begin by abstracting a plurality of parameters, for example all parameters the application 102 is configured to receive from a user, to determine whether the path 218 will flow to the security sink 210.

In one arrangement, the security report 110 can indicate the parameters that, when abstracted, drive the one or more paths (e.g., the path 218) to flow to one or more security sinks (e.g. the security sink 210) when the paths did not constitute security vulnerabilities when the black-box scan was performed. Moreover, the security report 110 can indicate values, or ranges of values, for the parameters that cause the path(s) to flow to the security sink(s).

FIG. 3 is a flow chart illustrating a method 300 of for analyzing vulnerable information flows in an application in accordance with another embodiment disclosed within this specification. At step 302, a black-box scan of the application can be performed, using a processor, to record a call-tree representation of call stacks arising in the application due to test inputs provided during the black-box scan.

At step 304, for each path in the call-tree representation that does not constitute a vulnerable information flow during the black-box scan, a static analysis can be performed to determine at least one parameter value that, when abstracted, drives execution of the application, via the path, to flow to the at least one security sink. As used herein, path in the call-tree representation that does not constitute a vulnerable information flow during the black-box scan means a path in the call-tree representation that either does not reach a security sink during the black-box scan, or a path that reaches a security sink after traversing a downgrader. In one aspect, for instance, a particular path may traverse a downgrader to reach a security sink during the black-box analysis. By abstracting the values during the static analysis, however, the application can be tested to determine whether the path can be driven to that same security sink, or another security sink, without traversing a downgrader.

By way of example, whether abstracting a single parameter value drives execution of the application, via the path, to flow to the security sink can be determined. Responsive to determining that abstracting the single parameter value does not drive execution of the application, via the path, to flow to the security sink, at least two parameter values can be abstracted. A determination can be made as to whether abstracting at least two parameter values drives execution of the application, via the path, to flow to the security sink. Further, responsive to determining that abstracting the two parameter values does not drive execution of the application, via the path, to flow to the security sink, at least three parameter values can be abstracted, and a determination can be made whether abstracting at least three parameter values drives execution of the application, via the path, to flow to the security sink. The process can continue until the application is driven to the security sink or all input parameters the application is configured to receive from a user have been abstracted.

In another example, parameter values for the parameters can be sequentially abstracted, individually, to identify which parameter values (if any), when individually abstracted, will drive execution of the application, via the path, to flow to the security sink. In yet another example, a parameter value for each respective parameter the application is configured to receive from a user can be abstracted to determine whether abstracting each of the parameter values will drive execution of the application, via the path, to flow to the security sink.

At step 306, for each path in the call-tree representation that does not constitute a vulnerable information flow during the black-box scan, a security confidence level of the path can be determined according to a number of parameter values that need to be abstracted to drive execution of the application, via the path, to flow to the at least one security sink. As noted, the path can be driven to a security sink it did not reach during the black-box scan, or driven along one or more edges, not identified in the black-box scan, to reach a security sink without traversing a downgrader.

At step 308, a security report can be generated identifying at least one of the paths in the call-tree representation that does not constitute a vulnerable information flow during the black-box scan, but flows to the at least one security sink when the at least one parameter value is abstracted during the static analysis. The security report also can indicate at least one parameter that, when its parameter value is abstracted, drives execution of the application, via the path, to flow to the at least one security sink during the black-box scan. The security report further can indicate a parameter value, or range of parameter values, for the parameter that drives execution of the application, via the path, to flow to the security sink. The security confidence level determined at step 306 also can be included in the security report.

Figure 4:
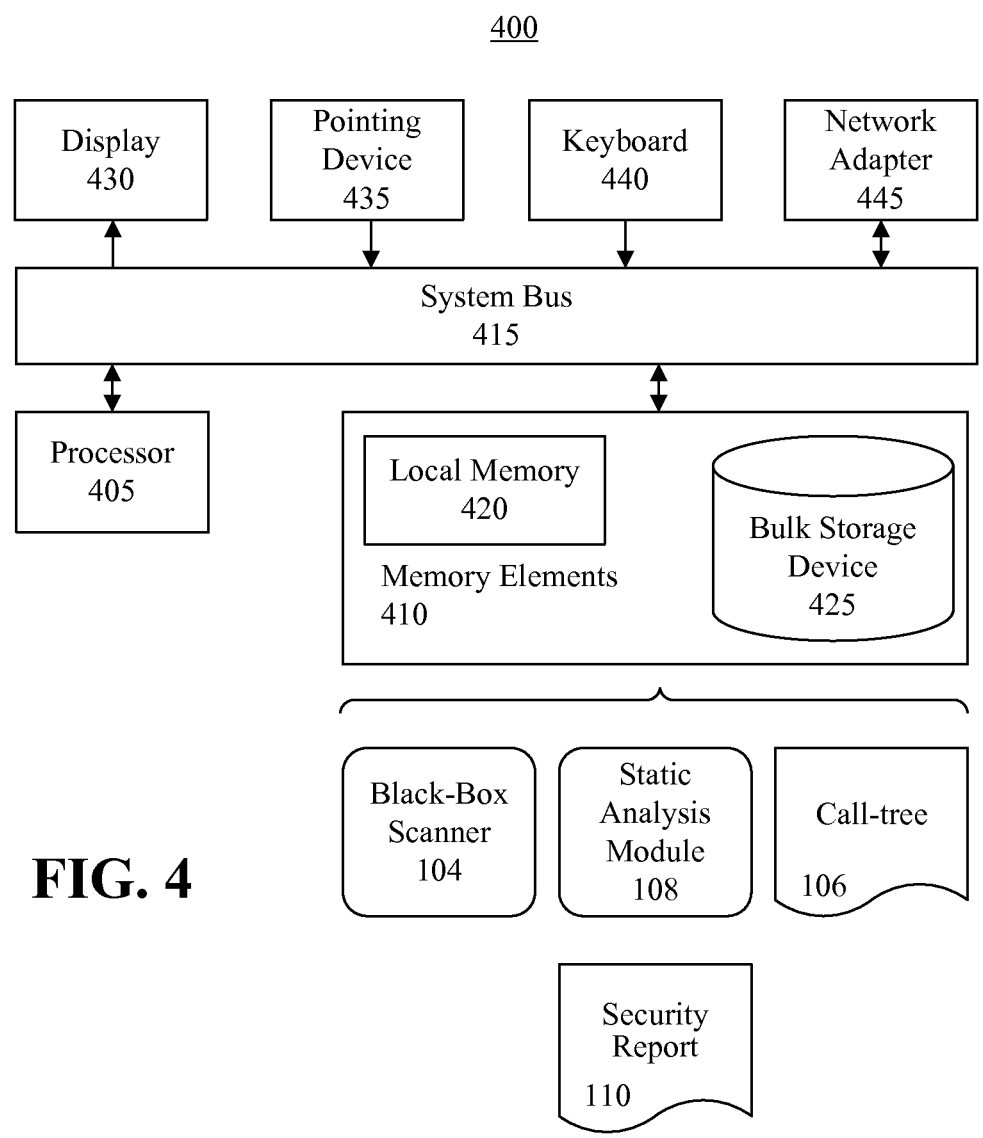
FIG. 4 is a block diagram illustrating a processing system for analyzing vulnerable information flows in an application in accordance with one embodiment disclosed within this specification.

FIG. 4 is a block diagram illustrating a processing system 400 for analyzing vulnerable information flows in an application in accordance with one embodiment disclosed within this specification. The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and a keyboard 440 can be coupled to the processing system 400. The I/O devices can be coupled to the processing system 400 either directly or through intervening I/O controllers. For example, the display 430 can be coupled to the processing system 400 via a graphics processing unit (GPU), which may be a component of the processor 405 or a discrete device. One or more network adapters 445 also can be coupled to processing system 400 to enable processing system 400 to become coupled to other systems, computer systems, remote printers, and/or remote storage devices through intervening private or public networks. Modems, cable modems, and Ethernet cards are examples of different types of network adapters 445 that can be used with processing system 400.

As pictured in FIG. 4, the memory elements 410 can store the components of the system 100 of FIG. 1, such as the black-box scanner 104 and the static analysis module 108. Being implemented in the form of executable program code, these components of the system 100 can be executed by the processing system 400 and, as such, can be considered part of the processing system 400. Moreover, the black-box scanner 104 and the static analysis module 108 are functional data structures that impart functionality when employed as part of the processing system 400 of FIG. 4.

As noted, in operation, the black-box scanner 104 can perform a black-box scan of the application 102 of FIG. 1. For in one arrangement, the application 102 can execute on another processing system to which the processing system 400 is communicatively linked, for example via the network adapter 445. In another arrangement, the application can execute on the processing system 400. The processing system 400 can execute the black-box scanner 104 to establish a user session with the application and record a call-tree representation 106 of call stacks arising in the application 102 due to test inputs provided during the black-box. The static analysis module 108 can perform a static analysis for each path in the call-tree representation that does not constitute a vulnerable information flow of the application 102 during the black-box scan during the black-box scan. As described herein, the static analysis can determine at least one parameter value that, when abstracted, drives execution of the application, via the path, to flow to at least one security sink. The static analysis module 108 also can generate the security report 110, as described herein. In this regard, the call-tree representation 106 also is a functional data structure that imparts functionality when processed by the processing system 400 of FIG. 4.

In one embodiment, the black-box scanner 104 and the static analysis module 108 can be implemented as IBM® Rational® Appscan® (IBM, Rational and Appscan are trademarks of International Business Machines Corporation in the United States, other countries, or both).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of analyzing vulnerable information flows in an application, the method comprising:
    performing, using a hardware processor, a black-box scan of the application;
    based on the black-box scan, recording a call-tree representation of a plurality of call stacks arising in the application due to test inputs provided during the black-box scan, the call tree representation indicating paths between the plurality of call stacks;
    performing, for each of the paths in the call-tree representation that does not constitute a vulnerable information flow during the black-box scan, a static analysis, and by the static analysis determining at least one parameter value that, when abstracted, drives execution of the application, via the path in the call-tree representation that does not constitute a vulnerable information flow during the black-box scan, to flow to the at least one security sink; and
    generating a security report identifying at least one of the paths in the call-tree representation that does not constitute the vulnerable information flow during the black-box scan, but flows to the at least one security sink when the at least one parameter value is abstracted.

2. The method of claim 1, further comprising:
    determining whether abstracting a single parameter value drives execution of the application, via the path in the call-tree representation that does not constitute a vulnerable information flow during the black-box scan, to flow to the security sink;
    responsive to determining that abstracting the single parameter value does not drive execution of the application, via the path in the call-tree representation that does not constitute a vulnerable information flow during the black-box scan, to flow to the security sink, abstracting at least two parameter values, and determining whether abstracting at least two parameter values drives execution of the application, via the path in the call-tree representation that does not constitute a vulnerable information flow during the black-box scan, to flow to the security sink.

3. The method of claim 2, further comprising:
    responsive to determining that abstracting the two parameter values does not drive execution of the application, via the path in the call-tree representation that does not constitute a vulnerable information flow during the black-box scan, to flow to the security sink, abstracting at least three parameter values, and determining whether abstracting at least three parameter values drives execution of the application, via the path in the call-tree representation that does not constitute a vulnerable information flow during the black-box scan, to flow to the security sink.

4. The method of claim 1, further comprising:
    determining, for each path in the call-tree representation that does not constitute a vulnerable information flow during the black-box scan, a security confidence level of the path according to a number of parameter values that need to be abstracted to drive execution of the application, via the path, to flow to the at least one security sink.

5. The method of claim 1, further comprising:
    determining whether abstracting a first parameter value drives execution of the application, via the path in the call-tree representation that does not constitute a vulnerable information flow during the black-box scan, to flow to the at least one security sink;
    responsive to determining that abstracting the first parameter value does not drive execution of the application, via the path in the call-tree representation that does not constitute a vulnerable information flow during the black-box scan, to flow to the at least one security sink, abstracting at least a second parameter value, and determining whether abstracting the second parameter value drives execution of the application, via the path in the call-tree representation that does not constitute a vulnerable information flow during the black-box scan, to flow to the at least one security sink.

6. The method of claim 1, wherein performing the static analysis to determine at least one parameter value that, when abstracted, drives execution of the application, via the path in the call-tree representation that does not constitute a vulnerable information flow during the black-box scan, to flow to the at least one security sink comprises:

abstracting a parameter value for each respective parameter the application is configured to receive from a user.

7. The method of claim 1, wherein the security report further indicates the at least one parameter that, when its parameter value is abstracted, drives execution of the application, via the path in the call-tree representation that does not constitute a vulnerable information flow during the black-box scan, to flow to the at least one security sink.

8. The method of claim 7, wherein the security report further indicates a parameter value, or range of parameter values, for the parameter that drives execution of the application, via the path in the call-tree representation that does not constitute a vulnerable information flow during the black-box scan, to flow to the at least one security sink.

9. A method of analyzing vulnerable information flows in an application, the method comprising:

performing a black-box scan, using a hardware processor, of the application;

based on the black-box scan, recording a call-tree representation of a plurality of call stacks arising in the application due to test inputs provided during the black-box scan, the call tree representation indicating paths between the plurality of call stacks;

performing, for each of the paths in the call-tree representation that does not constitute a vulnerable information flow during the black-box scan, a static analysis, and by the static analysis determining at least one parameter value that, when abstracted, drives execution of the application, via the path in the call-tree representation that does not constitute a vulnerable information flow during the black-box scan, to flow to the at least one security sink;

responsive to determining that abstracting the first parameter value does not drive execution of the application, via the path in the call-tree representation that does not constitute a vulnerable information flow during the black-box scan, to flow to the at least one security sink, abstracting at least a second parameter value, and determining whether abstracting both the first and second parameter values drives execution of the application, via the path in the call-tree representation that does not constitute a vulnerable information flow during the black-box scan, to flow to the at least one security sink; and generating a security report that identifies at least one of the paths in the call-tree representation that does not constitute the vulnerable information flow during the black-box scan, but flows to the at least one security sink when both the first and second parameter values are abstracted.

* * * * *